Dec. 5, 1939.  J. M. BIERER  2,182,169
BELTING SPLICE AND METHOD
Filed April 28, 1937  2 Sheets-Sheet 1
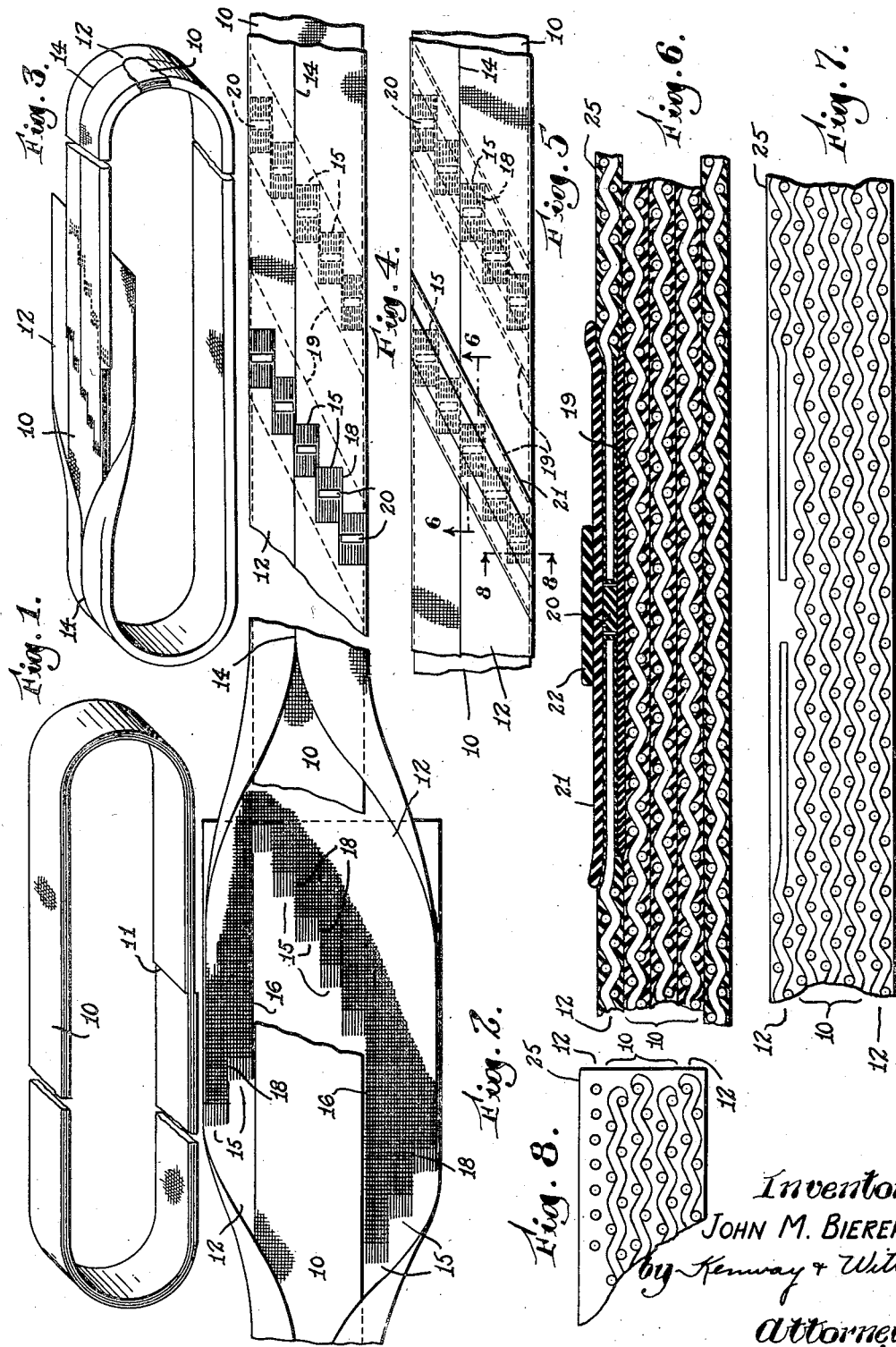
Inventor
JOHN M. BIERER
by Kenway & Witter
Attorneys

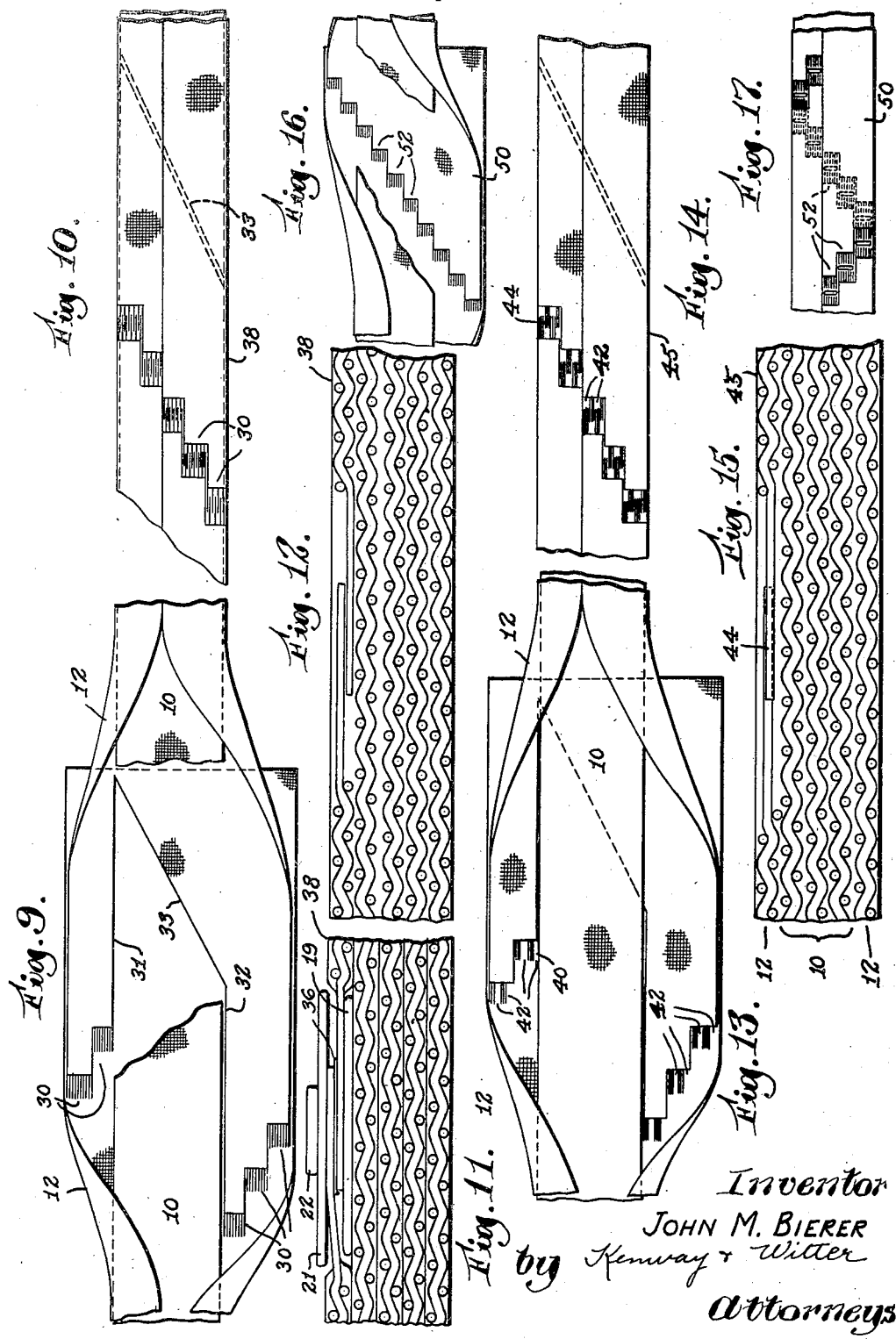

Patented Dec. 5, 1939

2,182,169

UNITED STATES PATENT OFFICE 2,182,169

BELTING SPLICE AND METHOD

John M. Bierer, Waban, Mass., assignor to Boston Woven Hose & Rubber Company, Cambridge, Mass., a corporation of Massachusetts Application April 28, 1937, Serial No. 139,429

18 Claims. (Cl. 154—4)

This invention relates to belting and more particularly to a novel splice for the facing cover thereof and to the method of forming the splice. The invention is especially applicable to endless belting wherein an endless belt body is faced on both sides by a cover extending longitudinally of and wrapped about the body and having its ends joined by a splice, and I have herein disclosed my invention in connection with a belt of this nature.

The body portion of endless belting is commonly constructed from a single strip of fabric wrapped longitudinally upon itself into a plurality of plies whereby forming a substantially continuous and endless structure. The application of a satisfactory facing cover to this body is a considerable problem due more particularly to the difficulty of splicing the ends of the cover with sufficient security and uniformity, it being apparent that such cover, applied as a strip longitudinally of the belt body, is continuous except at its spliced ends. Heretofore these ends have been straight cut diagonally across the cover and spliced along such cut ends, the cut usually being at an angle varying from 20° to 45°. In accordance with my invention I cut the ends of the cover diagonally thereacross along stepped lines producing diagonally arranged steps at each end of the cover. The cover is applied to the belt body with the steps at one end located adjacent to and in longitudinal alignment with the steps of the other end respectively and the splice is completed by vulcanizing rubber thereto under pressure. As will hereinafter appear such an arrangement produces a superior splice and has several advantages not present in the straight splice heretofore known and used.

The steps on the two ends of the cover may be of any desired size and shape and may be arranged in various relations as will hereinafter appear. My improved stepped splice permits a severing and removal of the filler threads in the steps and in the preferred form of the invention these threads are removed whereby leaving the warp threads intact, thus reducing the thickness of the steps and permitting the formation of a stronger and more uniform splice. The steps on the two cover ends can be arranged in abutting, spaced or overlapped relation and, in accordance with the invention, they are bound together into a strong and uniform splice by vulcanizing rubber thereto under pressure, the warp threads first being cemented to secure a strong vulcanizing bond thereto.

In accordance with a further aspect of the invention, alternate portions of the said warp threads of the steps may be removed and the two cover ends so arranged that the warp thread portions at each end are located in the gaps left by removal of the warp thread portions in the other end, thus producing an interlocked arrangement of the warp threads on the two ends of the cover and thereby forming substantially a continuous cover on and in intimate contact with the belt body.

In the accompanying drawings I have illustrated various preferred embodiments of the invention and have therein illustrated and hereinafter described and claimed certain further features which contribute to produce a superior product.

In the drawings,

Fig. 1 is a perspective view of an endless belt body to be enclosed within a facing cover bonded thereto in accordance with my invention, Fig. 2 is a fragmentary plan view showing the two cover ends about to be applied to the belt body, Fig. 3 is a perspective view showing one end of the cover cut and applied to the belt and the other end thereof free and uncut, Fig. 4 is a fragmentary plan view of the splice showing both ends of the cover cut and applied to the belt body, Fig. 5 is a like view of the splice ready for the vulcanizing treatment, Fig. 6 is an enlarged sectional view taken on line 6—6 of Fig. 5, Fig. 7 is a diagrammatic view showing the completed splice after vulcanization, Fig. 8 is a like diagrammatic view showing the completed splice as it appears along line 8—8 of Fig. 5, Fig. 9 is a fragmentary plan view like Fig. 2 but showing a modified form of the invention, Fig. 10 is a fragmentary plan view of the splice with both ends of the cover cut and applied to the belt body, Fig. 11 is a diagrammatic view showing the splice before vulcanization, Fig. 12 is a like view after vulcanization, Fig. 13 is a fragmentary plan view like Figs. 2 and 9 but showing a further modified form of the invention, Fig. 14 is a fragmentary plan view of the splice with both ends of the cover cut and applied to the belt body, Fig. 15 is a diagrammatic view showing the completed splice, Fig. 16 illustrates a further modified form of the invention.

Fig. 17 illustrates the cover of this form wrapped around the belt body.

Referring now more specifically to the drawings by reference characters, 10 indicates an endless belt body formed by wrapping a single strip of rubberized fabric 11 longitudinally upon itself into a plurality of plies. The belt is finished by applying a facing cover to this body, my invention being concerned only with the application of this cover and more particularly with the production of a superior splice at the ends of the cover. The cover which I employ comprises a fabric strip 12 of a width to wrap transversely around the body 10 with the edges abutting at one face of the belt into a seam 14.

The cover to be applied is first placed on a cutting table and one end is cut to the stepped pattern shown in Fig. 2. In accordance with this pattern the end is cut diagonally thereacross along three stepped lines in a manner producing a plurality of diagonally arranged steps 15, ten such steps being illustrated in the drawings. Two of these lines extend inwardly from the opposite edges of the cover and produce two and three steps respectively and from thence the cover is cut longitudinally at 16. From the inner ends of the lines 16 the third stepped line is formed and produces five steps 15 in the middle portion of the cover, the said five steps being relatively remote from the other steps adjacent to the cover edges.

One of the novel advantages gained by step-cutting the cover in accordance with my invention resides in the fact that such cutting permits removal of part or all of the filler threads in the steps, the drawings illustrating all of such threads as having been removed. In removing these threads, the step-cuts are extended into the fabric at 18 whereby severing the filler threads and permitting their ready removal from the steps. The warp threads not removed project outwardly from the cover ends and these threads are thoroughly cemented. This cement forms a bonding medium for the rubber to be vulcanized onto the threads and compensates for the friction rubber which is necessarily lost in removing the filler threads.

The manner of applying the cover to an endless belt body is illustrated in Fig. 3, the intermediate portion of the cover being placed against the inner face of the belt and the two edge portions being wrapped over the outer face and abutted to form the seam 14, all while the belt body is held in stretched condition. The step-cut end shown in Fig. 2 is first applied to the belt body and the remaining portion of the cover is then progressively applied and lapped over the outer face in the manner illustrated in Fig. 3, the uncut end of the cover being left free. This free end is then step-cut to conform to the first cut end and wherein the steps on one end will be adjacent to and in longitudinal alignment with the steps on the other end respectively.

In Figs. 4–8, I have illustrated the cover as cut in a manner spacing the steps on one end thereof from the steps on the other end, whereby leaving a gap between each pair of steps. In forming the splice, this gap and space around the warp threads of the steps are filled with rubber which in the vulcanizing treatment securely bonds the threads of the two ends. The preferred manner of treatment is illustrated in Fig. 6 wherein a layer of rubber gum 19 is laid diagonally across the splice beneath all the steps, layers 20 of rubber gum are placed respectively between each pair of steps, a layer 21 of rubber gum is laid diagonally across the splice above all the steps, and a further quantity 22 of rubber gum may be placed diagonally across the splice. It may also in some cases be desirable to place a breaker strip of fabric beneath and diagonally across the splice, the use of such breaker strips being common practice.

The splice in the condition illustrated in Fig. 6 is placed in a flat press and vulcanized under pressure to a degree sufficient to flow the several rubber layers together into a dense and homogeneous mass, form a secure bond with the warp threads and bring the exposed face of the splice into flush alignment with the corresponding face of the belt, substantially as illustrated in Fig. 7. The belt is then completed by curing the entire length thereof in the usual manner, preferably in a continuous press of the type disclosed in my copending application, Ser. No. 64,724 filed February 19, 1936, now Patent No. 2,110,076 dated March 1, 1938.

It will now be apparent that the resulting product is a continuous belt 25 having a continuous body portion 10 faced by a continuous cover strip 12, the cover at the splice being substantially equal to the remaining portion thereof in both strength and uniformity. It is well known that a straight diagonal splice is stronger than a straight splice extending directly across the belt since the former provides a greater length of end contact for engaging the bonding medium. It will furthermore be apparent that a stepped diagonal splice provides an even greater bonding contact and, what is even more important, permits removal of filler threads whereby a relatively large amount of rubber may be flowed into the splice and bonded firmly to the warp threads. Thus my improved stepped arrangement combines the advantages of the diagonal splice with the ravel splice and produces a stronger and more uniform product than has been heretofore possible.

It is well known that the outer face of a continuous belt is subjected to greater stress than is the inner face which contacts with the pulleys. For this reason a more elaborate and stronger splice is sometimes provided at the outer face than at the inner face. As illustrated in Figs. 9–12 the end of the cover may be cut to provide five steps 30 adjacent to the edges which overlap the outer face of the belt body, and from thence the cover may be cut along the lines 31, 32 and 33 to form a straight diagonal end 33 at the intermediate portion of the cover which engages the inner face of the belt body. The filler threads may be removed from the steps, the other end of the cover cut in a corresponding manner when applying the cover to the belt, and the warp threads cemented, all in the manner already described. However, as illustrated in Fig. 10, the second end of the cover in this case is cut to a length wherein the warp threads on the two ends overlap, the extent of such overlap being of any desired degree. It will be noted that the two straight diagonal cuts 33 are brought substantially into abutting relation on the inner face of the belt body and are spaced or staggered relative to the overlapping stepped ends on the outer face thereof, longitudinally of the belt.

This splice is finished in like manner as that already described in connection with Figs. 1–8, except that a layer 36 of rubber gum is preferably placed between the overlapped warp threads, this layer serving more completely to bond these overlapped threads together. The method of treating the abutting ends 33 forms no part of the present invention and need not therefore to be specifically described herein. It will be apparent that the completed splice is superior in both strength and uniformity due to the overlapping arrangement of the warp threads and to the staggered arrangement of the cover splices at the two opposite faces of the belt 38, it being furthermore apparent that the stronger and more expensive stepped splice serves the outer face of the belt while the straight and less expensive splice is sufficient for the inner face.

In Figs. 13-15, I have illustrated a further modified form of my invention wherein the warp threads are interlocked laterally. In this form the steps are substantially the same as those disclosed in Figs. 9-12 except that alternate portions of the warp threads on the steps 40 are removed whereby leaving alternate gaps 42 in the steps. The cover ends are cut, the filler threads removed, the warp threads cemented and the cover applied in like manner as described in reference to Figs. 9-12, the alternate warp thread portions on each end of the cover being respectively located in the gaps 42 left by the removal of the warp thread portions in the other end as illustrated in Fig. 14. This splice is finished in like manner as that already described in connection with Figs. 1-8 and when completed the warp threads at the splice are bonded securely together in an interlocked arrangement at 44 forming substantially a continuous cover for the belt body. Except for the difference in the splice, this belt 45 is the same as the other belts described herein.

It will be understood that the invention is not limited to any particular step-cutting pattern nor to the number, shape or size of the steps. For example, in Fig. 16 I have illustrated one end of the belt cover 50 as step-cut in a single line diagonally thereacross whereby producing a straight series of steps 52. The other end of the belt is cut in like manner and as the ends are wrapped about the belt body the steps are located in the arrangement illustrated in Fig. 17, the steps on one face of the belt being in spaced relation to the steps on the other face thereof longitudinally of the belt.

Having thus described my invention, what I claim as new and desire to secure by Letters Patent of the United States is:

1. A method of splicing the ends of a belt cover which consists in cutting each of the two ends of the cover diagonally thereacross along a stepped line producing on each end diagonally arranged steps each of well defined area and having a plurality of warp threads extending from an end of the cover, laying the ends onto the belt body with the steps of one end located adjacent to and respectively in alignment with the steps of the other end longitudinally of the belt, and completing the splice by vulcanizing rubber under pressure over an area including the steps.

2. The method defined in claim 1 wherein the steps on one end of the cover are located in spaced relation from the steps on the other end thereof longitudinally of the belting, and wherein rubber gum is placed in the gaps between the relatively spaced steps of the two ends prior to vulcanization.

3. The method defined in claim 1 wherein certain of said steps at each end of the cover are formed from the two edges of the cover inwardly to points leaving a gap therebetween equal to the width of the belt body and the remaining steps on each end are formed remotely from and along a line relatively angular to the steps at the cover edges, and wherein said remaining steps are located on one face of the belt body and the other steps are located on the other face thereof.

4. A method of splicing the ends of a belt cover which consists in cutting the two ends of the cover diagonally thereacross along stepped lines producing diagonally arranged steps at each end, removing filler threads in the steps, laying the ends onto the belt body with the steps of one end located adjacent to and in longitudinal alignment with the steps of the other end respectively, cementing the warp threads of the steps, and completing the splice by vulcanizing rubber thereto under pressure.

5. The method defined in claim 4 wherein the steps on one end of the cover are located in spaced relation from the steps on the other end thereof longitudinally of the belting.

6. The method defined in claim 4 wherein the steps on one end of the cover are located in spaced relation from the steps on the other end thereof longitudinally of the belting, and wherein layers of rubber gum are provided at the splice below the stepped ends and in the gap between the relatively spaced steps of the two ends prior to vulcanization.

7. The method defined in claim 4 wherein the steps on one end of the cover are located in overlapping relation on the steps of the other end thereof and wherein a layer of rubber gum is placed between the overlapped steps prior to vulcanization.

8. The method defined in claim 4 wherein rubber gum is provided at the splice both below and above the stepped ends prior to vulcanization.

9. A method of splicing the ends of a belt cover which consists in cutting the two ends of the cover diagonally thereacross along stepped lines producing diagonally arranged steps at each end, removing filler threads in the steps, removing alternate portions of the warp threads in each step whereby leaving relatively spaced warp thread portions, cementing the warp threads of said portions, laying the ends onto the belt body with the steps of one end located respectively in longitudinal alignment with the steps of the other end and with said warp thread portions of each end located in the gaps left by removal of the warp thread portions in the other end, and completing the splice by vulcanizing rubber thereto under pressure.

10. A method of splicing the ends of a belt cover onto an endless belt body which consists in cutting on one end of the cover adjacent to the side edges thereof diagonally arranged steps each of well defined area and having a plurality of warp threads extending from an end of the cover, applying the cover to the belt body with the cover seam on and extending longitudinally along the outer face of the belt body but leaving the other end of the cover free, cutting like diagonally arranged steps on the free end of the cover in position to align with the first named steps respectively when the free end is lapped over onto the belt body, lapping the free end onto the belt body with the steps of one end located adjacent to and respectively in alignment with the steps of the other end longitudinally of the belt, and completing the splice by vulcanizing rubber under pressure thereto over an area including the steps.

11. The method defined in claim 10 wherein the filler threads are removed from said steps and wherein the remaining warp threads therein are cemented prior to vulcanization.

12. The method defined in claim 10 wherein the free end of the cover is cut to a length providing a gap between the steps of the two ends when laid onto the belt body and wherein a layer of rubber gum is placed in this gap prior to vulcanization.

13. A belting splice for a belt having an endless body portion and a cover extending longitudinally of the body portion and secured in intimate contact therewith, comprising two belt cover ends being of stepped formation extending diagonally of the belt, each step comprising a well defined area and having a plurality of warp threads extending from an end of the cover and the steps on one end of the cover being adjacent to and respectively in alignment with the steps on the other end longitudinally of the belt, and vulcanized rubber binding said ends including the steps into a splice.

14. The belting splice defined in claim 13 wherein the steps on one end of the cover are spaced longitudinally of the belt from the steps on the other end, and wherein vulcanized rubber is located between and bonded onto the spaced steps.

15. The belting splice defined in claim 13 wherein filler threads are removed from the steps and vulcanized rubber is located below and above the steps and bonded thereto.

16. The belting splice defined in claim 13 wherein filler threads are removed from the steps and the steps are in overlapping relation longitudinally of the belt and are bonded together by vulcanized rubber.

17. The belting splice defined in claim 13 wherein the two side edges of the cover are brought together to form a seam longitudinally along the outer face of the belt and wherein said steps are formed only at the outer face of the belt, the two ends of the cover at the inner face of the belt being joined along a straight diagonal splice spaced longitudinally of the belt from the stepped splice at the outer face of the belt.

18. The belting splice defined in claim 13 wherein the cover steps at one face of the belt are in spaced relation to the steps at the other face thereof longitudinally of the belt and are joined together by rubber gum.

JOHN M. BIERER.